(12) United States Patent
Millican et al.

(10) Patent No.: US 9,964,052 B2
(45) Date of Patent: May 8, 2018

(54) MULTI-SOURCE GASEOUS FUEL BLENDING MANIFOLD

(71) Applicant: BM Group LLC, Plentywood, MT (US)

(72) Inventors: Brandon Millican, Plentywood, MT (US); Justin Tomlinson, Arnegard, ND (US)

(73) Assignee: BM Group LLC, Denver, CO (US)

( * ) Notice: Subject to any disclaimer, the term of this patent is extended or adjusted under 35 U.S.C. 154(b) by 416 days.

(21) Appl. No.: 14/841,257

(22) Filed: Aug. 31, 2015

(65) Prior Publication Data

US 2016/0061120 A1 Mar. 3, 2016

Related U.S. Application Data

(60) Provisional application No. 62/043,665, filed on Aug. 29, 2014.

(51) Int. Cl.
*F02B 13/00* (2006.01)
*F02D 19/08* (2006.01)

(52) U.S. Cl.
CPC .............. *F02D 19/081* (2013.01); *Y02T 10/36* (2013.01)

(58) Field of Classification Search
CPC ....... F02D 19/081; Y02T 10/36; F02M 21/02; F02M 21/0212; F02M 21/0215; F02M 21/0218; F02M 21/0221; F02M 21/0227; F02M 21/023; F02M 21/0236; F02M 21/0242; F02M 21/029
USPC .............................. 123/431, 27 GE, 525–527
See application file for complete search history.

(56) References Cited

U.S. PATENT DOCUMENTS

| | | |
|---|---|---|
| 7,019,626 B1 | 3/2006 | Funk |
| 7,444,986 B2 | 11/2008 | Shute |
| 7,996,147 B2 | 8/2011 | Gokhale |
| 8,061,121 B2 | 11/2011 | Haugen |
| 2011/0114058 A1 | 5/2011 | Cohn et al. |
| 2011/0166769 A1 | 7/2011 | Buechler et al. |

*Primary Examiner* — Hung Q Nguyen
(74) *Attorney, Agent, or Firm* — Sheridan Ross PC

(57) ABSTRACT

A device, system, and method are provided for blending multiple fuels in multiple states and optimizing the blended fuel for parameters including cost, energy content, pressure, etc. In a primary fuel/supplemental fuel system, the present invention allows a user to consume as much primary fuel as possible even if the primary fuel is hampered by inconsistent pressure or quality issue, thus ensuring a downstream engine runs continuously.

20 Claims, 2 Drawing Sheets

MULTI-SOURCE GASEOUS FUEL BLENDING MANIFOLD

CROSS-REFERENCE TO RELATED APPLICATIONS

This application claims priority under 35 U.S.C. § 119(e) to U.S. Provisional Patent Application Ser. No. 62/043,665 filed Aug. 29, 2014, which is incorporated herein in its entirety by reference.

FIELD OF THE INVENTION

Embodiments of the present invention generally relate to systems for blending a plurality of fuels. Specifically, embodiments of the present invention relate to systems that blend a plurality of fuels and optimize the blend, based on a variety of parameters such as price, fuel pressure, etc.

BACKGROUND OF THE INVENTION

Alternative fuels such as natural gas, propane, ethanol, hydrogen, biodiesel, butanol, methanol, and P-Series fuels are becoming increasingly popular and are supplementing traditional fuels such as gasoline and diesel. Users select these alternative fuels for a variety of reasons. For example, a user may desire the most cost effective fuel, and different governments may offer incentives for a user to buy certain types of fuel. Further, a user may be constrained by geography since alternative fuels have varying availability in different locations. Therefore, a user may choose a certain type of fuel because of its availability in a particular area.

While some alternative fuels may be preferable in some instances, they may not be preferable in every situation. For example, a natural gas supply may experience pressure drops, pressure spikes, other service interruptions, and even quality issues such as inconsistent energy content (BTU). Further scenarios include prices of various fuels changing over time, government incentives expiring or beginning, and a change in location of an engine. Therefore, it is desirable for an engine to have the capability of using more than one fuel so that a user may optimize fuel consumption for minimal price, location, or any other parameters.

There have been some previous efforts that attempt to address the issue of fuel optimization. For example, U.S. Pat. No. 8,061,121, which is incorporated herein by reference in its entirety, envisions a system where a car tank may be filled with traditional gasoline or an ethanol blend. A sensor detects the amount of alcohol in the air-fuel mixture, and based on sensor's measurement the system adjusts whether to operate the engine conventionally at stoichiometry or in a lean combustion mode. In a further system, U.S. Patent Publication No. 2011/0114058, which is incorporated herein by reference in its entirety, contemplates a system with two tanks one tank filled with gasoline and one tank filled with natural gas. This system comprises specialized bi-fuel spark ignition engine that allows the engine to operate on gasoline, natural gas, or a combination of the two.

One limitation with the prior art is that it does not contemplate a user's desire to use as much primary fuel as possible even in the face of quality issues, quantity problems, or other similar concerns. While alternative fuels may hold certain advantages in certain instances, it may be desirable (e.g., cost effective) to use as much primary fuel as possible while dealing with quantity issues, etc. Further none of the primary art devices allow for an uninterrupted supply of fuel when one source of fuel is abruptly shut off. This limitation with prior art devices results in performance issues with the engine, for example, a reduction in engine speed or RPMs. Due to these limitations associated with the prior art and more, the following disclosure describes an improved multi-source gaseous fuel blending manifold.

SUMMARY OF THE INVENTION

The above needs and other needs are addressed by the various embodiments and configurations of the present invention. This invention relates to a novel system, method, or device that blends multiple sources of fuel.

It is one aspect of various embodiments of the present invention to provide a system for blending multiple sources of gaseous fuel to maintain the continuity of operation and the performance of an engine. For example, one embodiment of the present invention includes a second fuel train that supplements a first fuel train in the event that the first fuel trains suffers from an interruption in fuel supply, fuel quality, etc., thus ensuring continuous operation and consistent performance of the engine.

It is another aspect of some embodiments of the present invention to provide a system for blending multiple sources of gaseous fuel to optimize a parameter of a gaseous fuel. Optimization may be applied to any discernible parameter of a gaseous fuel such as carbon content, price, octane number, sulfur content, Reid vapor pressure, minimum operating pressure of said engine, fuel price, energy content, peak flame temperature, flammability lower limit on a percent volume-basis, flammability upper limit on a percent volume-basis, stoichiometric air to fuel ratio on a mass basis, cetane number, etc. Further, parameters of the gaseous fuels may be prioritized for optimization. For example, in one embodiment of the present invention the gaseous fuel blend must meet a certain emissions profile. After this condition has been met, the gaseous fuel blend may be optimized by price. In an additional example, it may be desirable to use as much primary fuel as possible while only supplementing the primary fuel to maintain the fuel blend above a pressure threshold, BTU threshold, etc. It will be appreciated that other various discernible parameters of gaseous fuels and optimization logic are described in greater detail below.

It is one aspect of various embodiments of the present invention to provide a system for blending multiple sources of gaseous fuel that comprises a plurality of fuel trains. As mentioned above, a first fuel train may be supplemented by a second fuel train to account for any issues with the first fuel train such as supply interruption. Further embodiments of the present invention may also include a third fuel train, a fourth fuel train, and so on. Embodiments of the present invention that include a plurality of fuel trains have more options to optimize a blend of gaseous fuels. For example, a second fuel train may supplement a first fuel train to ensure stable pressure and cheaper price, but the first and second fuel blend may not have the requisite BTUs. Thus, a third fuel train blends with the second fuel train before blending with the first fuel train to meet all pertinent requirements. Additionally, a given fuel train may comprise a plurality of fuel sources. It will be appreciated that there may be various combinations of fuel trains and multiple fuel sources within a given fuel train.

It is another aspect of the present invention to utilize a combination of one-way valves (e.g., check valves, flappers valves, etc.) and one or more reservoirs to ensure the uninterrupted supply of fuel to an engine. Some embodiments may maximize the use of a gaseous primary fuel from a first fuel train and utilize a liquid tertiary fuel from a second fuel train to provide uninterrupted fuel flow to the engine. Check valves positioned before a fuel tee that combines the fuel trains ensure that fuel does not flow from the fuel tee back into the fuel trains. The liquid fuel in the second fuel train is vaporized and regulated to a pressure that is above the maximum pressure of the engine such that the engine could run solely on the tertiary fuel if needed. A primary check valve is positioned in the first fuel train with a cracking pressure set to the minimum pressure that the engine can run on the primary fuel. This primary check valve will cut off the flow of primary fuel below a predetermined threshold to prevent a substandard performance from other components in the system. With this configuration, if the pressure of the primary fuel is greater than the maximum pressure of the engine, then only the primary fuel is used. If the pressure of the primary fuel begins to drop below the maximum pressure of the engine, then the tertiary fuel enters the fuel tee to supplement the primary fuel. If the pressure of the primary fuel falls below the cracking pressure of the primary check valve, then the flow of the primary fuel is completely shut off and the engine must rely on the tertiary fuel. However, there is a lag between when the flow of the primary fuel stops and when the tertiary fuel can meet the demands of the engine. Therefore, a fuel reservoir may be positioned downstream of the primary check valve to store an amount of primary fuel that prevents interruption of fuel to the engine.

It is a further aspect of certain embodiments of the present invention to provide a system for blending multiple sources of gaseous fuel that samples the blended fuel downstream of a mixing point. By knowing the properties of the various gaseous fuels beforehand, an algorithm may combine the gaseous fuels in a certain proportion. However, variations in the qualities of the gaseous fuels may affect the theoretical properties of the blended fuel. Therefore, some embodiments of the present invention may sample the blended fuel downstream of the mixing point to optimize the blended fuel in real time.

It is another aspect of various embodiments of the present invention to provide a system for blending multiple sources of fuel that optionally includes a pop-off valve. Some embodiments of the present invention may include devices such as heaters to increase the pressure of one or more gaseous fuels or convert liquid fuels into a gaseous state. A pop-off valve may bleed off pressure in case the pressure of the fuels rises to a dangerous level. However, in the absence of a pop-off valve, the pressure regulators may be more robust to handle any surges in pressure. Embodiments of the present invention contemplate systems, methods, and devices that include a pop-off valve and systems, methods, and devices that do not include a pop-off valve.

It is yet another aspect of various embodiments of the present invention to provide a novel manifold or fuel tee that mixes different types of gaseous fuel. Embodiments of the present invention may comprise a plurality of fuel trains wherein each fuel train is connected to a different fuel supply (i.e., propane, natural gas, etc.). Uneven or stratified mixtures of multiple gaseous fuels result in uneven and inconsistent burning during operation of the engine. To ensure an even and uniform burn during operation, the manifold of the instant invention thoroughly blends the plurality of fuel types. Embodiments of the manifold may utilize baffles, turbulent air flow, application of a vortex motion, or any other mixing means discussed elsewhere herein.

One specific embodiment of the present invention is a fuel blending system for an engine positioned proximate to a producing hydrocarbon wellbore, comprising: (a) a fuel tee interconnected to a first fuel train and a second fuel train, the fuel tee receiving a primary fuel from the first fuel train and a tertiary fuel from the second fuel train, the fuel tee interconnected to an engine having a maximum pressure; (b) the first fuel train comprising: (1) a primary fuel input from the producing hydrocarbon wellbore supplying the primary fuel; (2) a first primary check valve having an opening pressure that is less than the maximum pressure of the engine; (3) a fuel reservoir positioned downstream from the primary check valve comprising a reservoir volume to store a predetermined volume of the primary fuel; (4) a second primary check valve having an opening pressure that is less than the opening pressure of the first primary check valve; (c) the second fuel train comprising: (1) a tertiary fuel input supplying a liquid tertiary fuel; (2) a vaporizer configured to vaporize the liquid tertiary fuel into a gaseous tertiary fuel, the vaporizer regulating a pressure of the gaseous tertiary fuel to a tertiary pressure, the tertiary pressure is greater than the maximum pressure of the engine; and (3) a tertiary check valve having an opening pressure that is less than the tertiary pressure.

Some embodiments of the present invention may comprise addition components. In some embodiments the second fuel train may further comprise a second vaporizer configured to vaporize the liquid tertiary fuel into the gaseous tertiary fuel, the second regulating the pressure of the gaseous tertiary fuel to the tertiary pressure, wherein an outlet tee combines outlets of the vaporizers, wherein the outlet tee is located less than approximately 6" from the outlets of the vaporizers. In some embodiments, the tertiary check valve is located approximately equidistant between the outlet tee and the fuel tee. In various embodiments, the fuel tee is located less than approximately 10" from a regulator of the engine.

In some embodiments, the various opening pressures and regulated pressures may be set to specific ranges of pressures. For example, the opening pressure of the first primary check valve may be between approximately 6 and 8 PSI. Further, the opening pressure of the second primary check valve and/or the tertiary check valve may be between approximately 0.036 and 0.073 PSI. The tertiary pressure may be approximately 0.073 PSI greater than the maximum pressure of the engine. The predetermined volume of the primary fuel may be approximately 1000 cubic inches. In some embodiments, the primary fuel is natural gas and the tertiary fuel is liquid propane.

Yet another specific embodiment of the present invention is a method of blending fuel for an engine, comprising: (a) providing a fuel tee that interconnects a first fuel train and a second fuel train to an engine having a maximum pressure; (b) providing, by a primary fuel input, a primary fuel for the first fuel train, the primary fuel having a pressure; (c) passing the primary fuel through a primary check valve having a cracking pressure that is less than the maximum pressure of the engine; (d) passing the primary fuel through a fuel reservoir having a reservoir volume, wherein the reservoir volume stores a reserve of the primary fuel; (e) providing, by a tertiary fuel input, a liquid tertiary fuel for the second fuel train; (f) vaporizing, by a vaporizer, the liquid tertiary fuel into a gaseous tertiary fuel, the vaporizer regulating the gaseous tertiary fuel to a tertiary pressure, the tertiary pressure is greater than the maximum pressure of the engine; (g) closing the primary check valve when the pressure of the primary fuel is less than the cracking pressure of the primary check valve; and (h) drawing the reserve of the primary fuel into the fuel tee and into the engine.

In some embodiments, the present invention further comprises passing the primary fuel through a second primary check valve having a cracking pressure that is less than the cracking pressure of the primary check valve; and passing the tertiary fuel through a tertiary check valve having a cracking pressure that is less than the tertiary pressure. In various embodiments, the cracking pressure of the second primary check valve may be between approximately 0.036 and 0.073 PSI, and the cracking pressure of the tertiary check valve may be between approximately 0.036 and 0.073 PSI. In some embodiments, the cracking pressure of the primary check valve may be between approximately 6 and 8 PSI. In various embodiments, the tertiary pressure may be approximately 0.073 PSI greater than the maximum pressure of the engine. In some embodiments, the reservoir volume may be approximately 1000 cubic inches.

Various embodiments of the present invention may comprise additional steps. For example, embodiments may further comprise vaporizing, by a second vaporizer, the liquid tertiary fuel into the gaseous tertiary fuel, the second vaporizer regulating the gaseous tertiary fuel to the tertiary pressure, wherein an outlet tee combines outlets of the vaporizers, wherein the outlet tee is located less than approximately 6" from the outlets of the vaporizers. In various embodiments, the tertiary check valve may be located approximately equidistant between the outlet tee and the fuel tee. In some embodiments, the fuel tee may be located less than approximately 10" from a regulator of the engine. In some embodiments, the primary fuel is natural gas and the tertiary fuel is liquid propane, and the engine is positioned proximate to a producing hydrocarbon wellbore.

Another specific embodiment of the present invention is a fuel blending system for an engine positioned proximate to a producing hydrocarbon wellbore, comprising (a) a fuel tee interconnected to a first fuel train and a second fuel train, the fuel tee receiving a primary fuel from the first fuel train, and the fuel tee receiving a tertiary fuel from the second fuel train, the fuel tee interconnected to an engine having a maximum pressure, wherein the fuel tee is located less than approximately 10" from a regulator of the engine; (b) the first fuel train comprising (1) a primary fuel input supplying the primary fuel; (2) a first primary flapper valve having a cracking pressure that is between approximately 6 and 8 PSI; (3) a fuel reservoir comprising a reservoir volume to store a reserve of the primary fuel, wherein the reservoir volume is approximately 1000 cubic inches; (4) a second primary flapper valve having a cracking pressure that is between approximately 0.036 and 0.073 PSI; (c) the second fuel train comprising (1) a tertiary fuel input supplying a liquid tertiary fuel; (2) a first vaporizer configured to vaporize the liquid tertiary fuel into a gaseous tertiary fuel, the first vaporizer regulating a pressure of the gaseous tertiary fuel to a tertiary pressure, the tertiary pressure is approximately 0.073 PSI greater than the maximum pressure of the engine; (3) a second vaporizer configured to vaporize the liquid tertiary fuel into the gaseous tertiary fuel, the second regulating the pressure of the gaseous tertiary fuel to the tertiary pressure, wherein an outlet tee combines outlets of the vaporizers, wherein the outlet tee is located less than approximately 6" from the outlets of the vaporizers, and (4) a tertiary flapper valve having a cracking pressure that is between approximately 0.036 and 0.073 PSI, wherein the tertiary flapper valve is located approximately equidistant between the outlet tee and the fuel tee.

One specific embodiment of the present invention is a fuel blending system for a hydrocarbon-based, fuel-powered engine having a minimum operating pressure and a maximum operating pressure, comprising a first fuel train comprising: (a) a primary fuel input supplying a primary fuel having a pressure; (b) a primary regulator for regulating the pressure of the primary fuel, wherein the primary regulator has a minimum output pressure and a maximum output pressure, wherein the minimum output pressure of the primary regulator is less than the minimum operating pressure of the engine, and the maximum output pressure of the primary regulator is greater than the maximum operating pressure of the engine; (c) a sensor for detecting the regulated pressure of the primary fuel below a predetermined threshold; a second fuel train comprising: (d) a tertiary fuel input supplying a liquid tertiary fuel; (e) a vaporizer configured to convert the liquid tertiary fuel to a gaseous tertiary fuel having a pressure; (f) a tertiary regulator for regulating the pressure of the tertiary fuel, wherein the tertiary regulator has a minimum output pressure and a maximum output pressure, wherein the minimum output pressure of the tertiary regulator is less than the minimum operating pressure of the engine, and the maximum output pressure of the tertiary regulator is greater than the maximum operating pressure of the engine, and a mixing point that combines the primary fuel and the tertiary fuel such that the combined fuel has a pressure greater than the predetermined threshold and within the minimum operating pressure and the maximum operating pressure of the engine.

Another specific embodiment of the present invention is a method of combining fuels for a hydrocarbon-based, fuel-powered engine having a minimum operating pressure and a maximum operating pressure, comprising: (a) providing a first fuel train having a primary fuel input, the primary fuel input supplying a primary fuel having a pressure; (b) regulating the pressure of the primary fuel using a primary regulator, wherein the primary regulator has a minimum output pressure and a maximum output pressure, wherein the minimum output pressure of the primary regulator is less than the minimum operating pressure of the engine, and the maximum output pressure of the primary regulator is greater than the maximum operating pressure of the engine; (c) detecting, by a sensor, the regulated pressure of the primary fuel below a predetermined threshold; (d) providing a second fuel train having a tertiary fuel input, the tertiary fuel input supplying a liquid tertiary fuel; (e) passing the liquid tertiary fuel through a vaporizer to convert the tertiary fuel to a gaseous tertiary fuel having a pressure; (f) regulating the pressure of the tertiary fuel using a tertiary regulator, wherein the tertiary regulator has a minimum output pressure and a maximum output pressure, wherein the minimum output pressure of the tertiary regulator is less than the minimum operating pressure of the engine, and the maximum output pressure of the tertiary regulator is greater than the maximum operating pressure of the engine; and (g) combining the primary fuel and the tertiary fuel at a mixing point such that the combined fuel has a pressure greater than the predetermined threshold and within the minimum operating pressure and the maximum operating pressure of the engine.

Yet another specific embodiment of the present invention is a fuel blending system for a hydrocarbon-based, fuel-powered engine having a minimum operating pressure and a maximum operating pressure, comprising a first fuel train comprising: (a) a primary fuel input supplying a primary fuel having a pressure; (b) a primary regulator for regulating the pressure of the primary fuel, wherein the primary regulator has a minimum output pressure and a maximum output pressure, wherein the minimum output pressure of the primary regulator is less than the minimum operating pressure of the engine, and the maximum output pressure of the primary regulator is greater than the maximum operating pressure of the engine, wherein the maximum operating pressure of the engine is a maximum pressure for 120% of the gaseous fuel required to power a maximum load of the engine; (c) a secondary fuel input supplying a secondary fuel having a pressure; (d) a secondary regulator for regulating the pressure of the secondary fuel, wherein the secondary regulator has a minimum output pressure and a maximum output pressure, wherein the minimum output pressure of the secondary regulator is less than the minimum operating pressure of the engine, and the maximum output pressure of the secondary regulator is greater than the maximum operating pressure of the engine; (e) a fuel tee that combines the secondary fuel with the primary fuel to supplement the primary fuel; (f) a sensor for detecting the regulated pressure of the primary fuel below a predetermined threshold; a second fuel train comprising: (g) a tertiary fuel input supplying a liquid tertiary fuel; (h) a vaporizer configured to convert the liquid tertiary fuel to a gaseous tertiary fuel having a pressure; (i) a tertiary regulator for regulating the pressure of the tertiary fuel, wherein the tertiary regulator has a minimum output pressure and a maximum output pressure, wherein the minimum output pressure of the tertiary regulator is less than the minimum operating pressure of the engine, and the maximum output pressure of the tertiary regulator is greater than the maximum operating pressure of the engine; and a mixing point that combines the primary fuel and the tertiary fuel such that the combined fuel has a pressure greater than the predetermined threshold and within the minimum operating pressure and the maximum operating pressure of the engine.

The Summary of the Invention is neither intended nor should it be construed as being representative of the full extent and scope of the present invention. The present invention is set forth in various levels of detail in the Summary of the Invention as well as in the attached drawings and the Detailed Description of the Invention and no limitation as to the scope of the present invention is intended by either the inclusion or non-inclusion of elements or components. Additional aspects of the present invention will become more readily apparent from the Detailed Description, particularly when taken together with the drawings.

The above-described embodiments, objectives, and configurations are neither complete nor exhaustive. As will be appreciated, other embodiments of the invention are possible using, alone or in combination, one or more of the features set forth above or described in detail below.

The phrases "at least one," "one or more," and "and/or," as used herein, are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

Unless otherwise indicated, all numbers expressing quantities, dimensions, conditions, and so forth used in the specification and claims are to be understood as being modified in all instances by the term "about."

The term "a" or "an" entity, as used herein, refers to one or more of that entity. As such, the terms "a" (or "an"), "one or more," and "at least one" can be used interchangeably herein.

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C. § 112(f). Accordingly, a claim incorporating the term "means" shall cover all structures, materials, or acts set forth herein, and all of the equivalents thereof. Further, the structures, materials, or acts and the equivalents thereof shall include all those described in the summary of the invention, brief description of the drawings, detailed description, abstract, and claims themselves.

BRIEF DESCRIPTION OF THE DRAWINGS

The accompanying drawings, which are incorporated in and constitute a part of the specification, illustrate embodiments of the invention and together with the Summary of the Invention given above and the Detailed Description of the drawings given below, serve to explain the principles of these embodiments. In certain instances, details that are not necessary for an understanding of the invention or that render other details difficult to perceive may have been omitted. It should be understood, of course, that the invention is not necessarily limited to the particular embodiments illustrated herein. Additionally, it should be understood that the drawings are not necessarily to scale.

Figure 1:
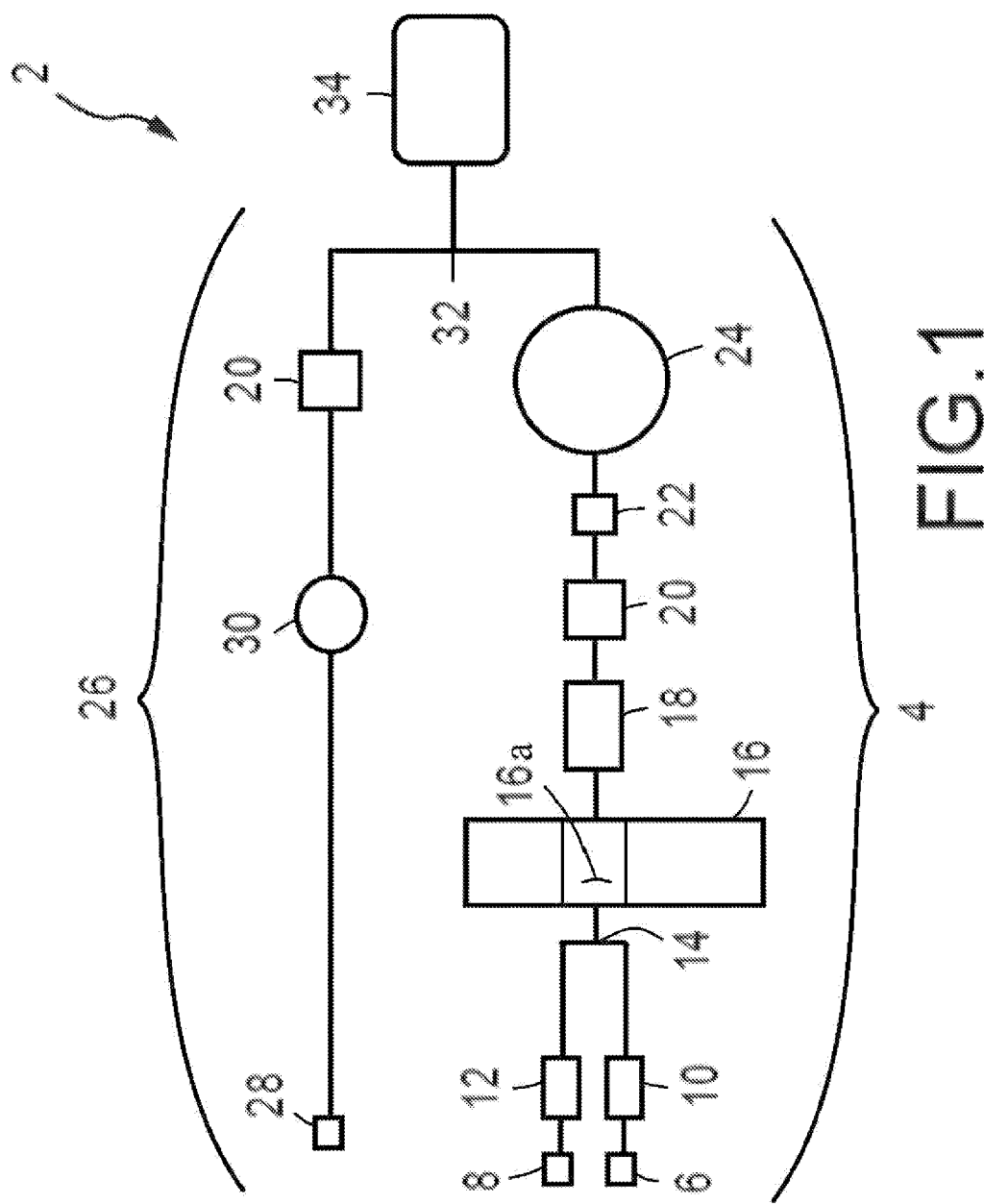
FIG. 1 is a flow diagram of a fuel blending system according to embodiments of the present invention.

Similar components and/or features may have the same reference label. Further, various components of the same type may be distinguished by following the reference label by a letter that distinguishes among the similar components. If only the first reference label is used, the description is applicable to any one of the similar components having the same first reference label irrespective of the second reference label.

A list of the various components shown in the drawings and associated numbering is provided herein:

| Number | Component |
| --- | --- |
| 2 | Fuel Blending System |
| 4 | First Fuel Train |
| 6 | Primary Fuel Input |
| 8 | Secondary Fuel Input |
| 10 | Primary Pressure Regulator |
| 12 | Secondary Pressure Regulator |
| 14 | Fuel Tee |
| 16 | Fuel Reservoir |
| 16a | Inlet Diverter |
| 18 | Knock Down Pressure Regulator |
| 20 | Shut Off Valve |
| 22 | Pressure Check Valve |
| 24 | Engine Pressure Regulator |
| 26 | Second Fuel Train |
| 28 | Tertiary Fuel Input |
| 30 | Tertiary Fuel Vaporizer |
| 32 | Mixing Point |
| 34 | Vacuum Source |
| 36 | First Primary Check Valve |
| 38 | Filter |
| 40 | Second Primary Check Valve |
| 42 | Tertiary Check Valve |
| 44 | Engine Fluid |

DETAILED DESCRIPTION

The present invention has significant benefits across a broad spectrum of endeavors. It is the Applicant's intent that this specification and the claims appended hereto be accorded a breadth in keeping with the scope and spirit of the invention being disclosed despite what might appear to be limiting language imposed by the requirements of referring to the specific examples disclosed. To acquaint persons skilled in the pertinent arts most closely related to the present invention, a preferred embodiment that illustrates the best mode now contemplated for putting the invention into practice is described herein by, and with reference to, the annexed drawings that form a part of the specification. The exemplary embodiment is described in detail without attempting to describe all of the various forms and modifications in which the invention might be embodied. As such, the embodiments described herein are illustrative, and as will become apparent to those skilled in the arts, may be modified in numerous ways within the scope and spirit of the invention.

Although the following text sets forth a detailed description of numerous different embodiments, it should be understood that the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims. To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning.

Various embodiments of the present invention are described herein and as depicted in the drawings. It is expressly understood that although the figures depict systems and methods for blending gaseous fuels, the present invention is not limited to these embodiments.

Now referring to FIG. 1, a fuel blending system 2 comprising a first fuel train 4 and a second fuel train 26 is provided. The first fuel train 4 comprises a primary fuel input 6 and a secondary fuel input 8. The fuel inputs 6, 8 connect the fuel blending system 2 to any gas or liquid fuel supply. For example, in one embodiment the primary fuel input 6 connects the fuel blending system 2 to a natural gas distribution line, and the second fuel input 8 connects the fuel blending system 2 to a vaporized propane supply.

In the event that one or both of these inputs 6, 8 contain liquid fuel, one or more vaporizers may be used to completely vaporize the liquid fuel. In some embodiments, the one or more vaporizers may produce gaseous fuel having a pressure that is equal to or greater than the maximum operating pressure of the engine. In various embodiments, the maximum operating pressure is a maximum pressure for 120% of the gaseous fuel required to power a maximum load of the engine, which allows the system 2 to retain continuity of operation for all applicable code & requirements for prime rated and continuous duty rated prime movers. In other embodiments, the maximum operating pressure of the engine is a maximum pressure between approximately 100% and 150% of the gaseous fuel required to power a maximum load of the engine.

The fuel inputs 6, 8 may be any ball valve, solenoid, check valve, butterfly valve, or any other device that controls the flow of gas or liquid. Other aspects of the connection between the fuel blending system 2 and the gas or liquid fuel supply such as conduit sizing, location, application, material, etc. may be dictated by Application & Installation Guides for a given manufacturer of a fuel powered engine or a given model of fuel powered engine. It will be appreciated that there may be a variety of embodiments of fuel inputs 6, 8 that connect the fuel blending system 2 to a gas or liquid fuel supply while complying with constraints imposed by the manufacturer or other entity.

Next, fuel from the primary fuel input 6 flows into a primary regulator 10, and fuel from the secondary fuel input 8 flows into the secondary regulator 12. The regulators 10, 12 control or step down the pressure of the incoming fuel. Some embodiments of the present invention may utilize a direct-operated, spring-loaded, pressure reducing regulator such as a Big Joe regulator. However, in various embodiments a variety of other regulators may control or step down the pressure of the incoming fuel.

Various embodiments of the present invention may operate in the absence of a pop-off valve placed in series with the regulators 10, 12. In these configurations, a maximum input pressure of the regulators 10, 12 can be rated ten times (1000%) higher than the anticipated maximum fuel source pressure if all regulations were to fail.

After the regulators 10, 12 control or step down the pressure of the incoming fuel, the regulators 10, 12 output the fuel at a certain pressure. In various embodiments, the minimum output pressure of the regulators 10, 12 can meet or fall short of the minimum operating pressure of the fuel-powered engine. In some embodiments, the minimum operating pressure may be established when the engine is starting, idling, jogging, or in a "no load" condition. Further in various embodiments, the maximum output pressure of the regulators 10, 12 can meet or exceed the maximum operating pressure of the engine, which as noted above, may be a maximum pressure for 120% of the gaseous fuel required to power a maximum load of the engine, which allows the system 2 to retain continuity of operation for all applicable code & requirements for prime rated and continuous duty rated prime movers.

In some embodiments of the present invention, the regulators 10, 12 have different output pressure ranges. For example, in one embodiment the primary regulator 10 has a higher output pressure than the secondary regulator 12, which allows for greater use of the primary fuel. Adjustable regulator output pressure allows a user or electronic system to mixing different portions of the primary and secondary fuels to meet a condition (e.g., emission standards) or to achieve an optimization (e.g., cost). More specifically, a sensor or sensors may monitor the downstream pressure of, for example, the primary fuel to determine if the pressure of the primary fuel falls below a predetermined threshold. If this is the case, then the system 2 may allow a secondary fuel that has a pressure that is higher than the predetermined threshold to supplement the primary fuel until the supplemented primary fuel also has a pressure that is higher than the predetermined threshold. The same supplement function may be applied to parameters such as BTU energy content. If the BTU energy content falls below a predetermined threshold, a secondary fuel with a BTU energy content that is higher than the predetermined threshold may supplement the primary fuel until the supplemented primary fuel has a BTU energy content that is higher than the predetermined threshold.

After exiting the regulators 10, 12, the fuel from the primary source and the fuel from the secondary source mix together at a fuel tee 14. This fuel tee 14 may simply be "tee" junction pipe fitting that combines two pipe inputs into a single pipe output. A "tee" junction pipe fitting ensures that conduit from each regulator 10, 12 is equidistant, but in other embodiments the conduits are not equidistant. In some embodiments, the fuel tee 14 may comprise baffles or other similar features to impart a vortex motion on the two fuels to ensure a more complete blend. In various embodiments, the fuel tee 14 is positioned three times the length of the regulators' 10, 12 fittings or more away from the regulators 10, 12 to prevent back pressuring. Other embodiments may have other positioning constraints to comply with any Application & Installation Guides or other regulations.

Next, a conduit guides the supplemented fuel from the fuel tee 14 to a fuel reservoir 16 and/or a scrubbing system. One or more sensors may be positioned on or in the conduit to sample various parameters of the supplemented fuel such as mixture percentage, pressure, BTU, or any other parameter discussed elsewhere herein. If one or more of the parameters falls below a predetermined threshold, then the supplemented primary fuel may be supplemented by yet another secondary or tertiary fuel to meet all relevant parameter thresholds. Examples of sensors include oxygen sensors, mass spectrometers, water sensor, MAP sensor, COSA 9600 BTU Analyzer, ECT sensor, air/fuel sensor, crankshaft position sensor, vehicle speed sensor, variable reluctance sensor, turbine speed sensor, air flow meter, flow sensor, gas meter, mass flow sensor, among many other sensors.

The fuel blending system 2 may optionally comprise a fuel reservoir 16 and/or a scrubbing system. The fuel reservoir 16 stores blended fuel in the event of an interruption in supply or pressure such that the fuel-powered engine operates continuously. A scrubbing system of the fuel reservoir 16 removes traces of liquid droplets from the supplemented primary fuel to protect downstream equipment from damage and/or failure. When the supplemented primary fuel first enters the scrubbing system it encounters an inlet diverter 16a which causes an initial separation of the liquid droplets from the supplemented primary fuel such that the heavier liquid droplets descend while the gas rises. The scrubbing system may also comprise a vaned mist extractor to further reduce liquid droplets. The scrubbing system may remove liquid droplets by gravity, centrifugal force, impingement, or any other method that separates liquid droplets from the supplemented primary fuel.

Next, the supplemented primary fuel enters a knock down pressure regulator 18 to more precisely tune the pressure of the supplemented primary fuel and control the engine operating pressure. The knock down pressure regulator 18 may be any pressure regulator that steps down pressure or otherwise controls pressure.

After the knock down pressure regulator 18, the supplemented primary fuel flows through a shut off valve 20, which provides the ability to completely shut down the flow of fuel during an emergency. The shut off valve 20 may be operatively connected to an electronic monitoring system such that upon an event trigger, the shut off valve 20 will stop the flow of the blended fuel. In other embodiments, the shut off valve 20 impedes or redirects the flow of the supplemented primary fuel so as to not damage any upstream components with back pressure.

Next, the supplemented primary fuel enters a check valve 22 to control any possible back pressure issues and ensure that the supplemented primary fuel flows in one direction. In various embodiments, the check valve 22 is set at 5% above an operating pressure required to run 120% of the fuel required to power the engine's maximum load, which allows the engine to maintain continuity of operation for all applicable code and requirements for prime rated and continuous duty rate prime movers. In some embodiments, the check valve 22 is set at approximately 5% above an operating pressure required to run 100% of the fuel required to power the engine's maximum load. In other embodiments, the check valve 22 is set approximately 5-10% above an operating pressure required to run 120% of the fuel required to power the engine's maximum load.

After the check valve 22, the supplemented primary fuel enters an engine pressure regulator 24 to more precisely tune the pressure of the supplemented primary fuel and control the engine operating pressure. In other embodiments, the engine pressure regulator 24 may be any pressure regulator that steps down pressure or otherwise controls pressure.

Again referring to FIG. 1, the fuel blending system 2 comprises the second fuel train 26. In this embodiment, a tertiary fuel input 28 connects the fuel blending system 2 to any gas or liquid fuel supply. For example, in one embodiment the tertiary fuel input 28 connects the fuel blending system 2 to a liquid propane system. The tertiary fuel input 28 may be any ball valve, solenoid, check valve, butterfly valve, or any other device that controls the flow of gas or liquid. Other aspects of the connection between the fuel blending system 2 and the gas or liquid fuel supply such as conduit sizing, location, application, material, etc. may be dictated by Application & Installation Guides for a given manufacturer of a fuel powered engine or a given model of fuel powered engine. In various embodiments, the tertiary fuel input 28 may connect the fuel blending system 2 to a gas or liquid fuel supply while complying with constraints imposed by the manufacturer or other entity.

Next, the fuel flows through one or more tertiary fuel vaporizers 30, which convert fuel in a liquid state to fuel in a gaseous state. The tertiary fuel vaporizers 30 such as feed-back systems and feed out systems may utilize external heat sources to help convert the fuel to a gaseous state. Feed-back systems allow pressure to build up in a vessel before the fuel continues downstream while feed-out system simply add heat as the fuel passes by. The tertiary fuel vaporizer 30 may output the fuel at a certain pressure. In various embodiments, the minimum output pressure of the tertiary fuel vaporizer 30 can meet or fall short of the minimum operating pressure of the fuel-powered engine. In some embodiments, the minimum operating pressure may be established when the engine is starting, idling, jogging, or in a "no load" condition. Further in various embodiments, the maximum output pressure of the tertiary fuel vaporizer 30 can meet or exceed the maximum operating pressure of the engine, which as noted above, may be a maximum pressure for 120% of the gaseous fuel required to power a maximum load of the engine, which allows the system 2 to retain continuity of operation for all applicable code & requirements for prime rated and continuous duty rated prime movers.

After the liquid fuel has been converted to gas, the fuel passes through a shut off valve 20. As described elsewhere herein, the shut off valve 20 provides the ability to completely shut down the flow of fuel during an emergency. The shut off valve 20 may be operatively connected to an electronic monitoring system such that upon an event trigger or emergency, the shut off valve 20 with stop of the flow of the blended fuel. In other embodiments, the shut off valve 20 impedes or redirects the flow of the blended fuel so as to not damage any upstream components.

A tertiary regulator may be included in the second fuel train 26 to step down or control the pressure of the tertiary fuel when the vaporizer 30 does not regulate the pressure of the gaseous tertiary fuel. After the tertiary regulator controls or steps down the pressure of the incoming fuel, the tertiary regulator outputs the fuel at a certain pressure. In various embodiments, the minimum output pressure of the tertiary regulator can meet or fall short of the minimum operating pressure of the fuel-powered engine. In some embodiments, the minimum operating pressure may be established when the engine is starting, idling, jogging, or in a "no load" condition. Further in various embodiments, the maximum output pressure of the tertiary regulator can meet or exceed the maximum operating pressure of the engine, which as noted above, may be a maximum pressure for 120% of the gaseous fuel required to power a maximum load of the engine, which allows the system 2 to retain continuity of operation for all applicable code & requirements for prime rated and continuous duty rated prime movers.

The fuels from the first fuel train 4 and the second fuel train 26 meet at a mixing point 32 or a fuel tee. Similar to the fuel tee 14, the mixing point 32 mixes the supplemented primary fuel from the first fuel train 4 and the gaseous fuel from the second fuel train 26 into a combined fuel that is then supplied to the engine. In some embodiments, the mixing point 32 comprises baffles or other similar features to impart a vortex motion on the two fuels to ensure a more complete blend.

In the embodiment depicted in FIG. 1, the engine is a vacuum source 34, which draws in the combined fuel from the mixing point 32. In this embodiment, the engine is a fuel-powered, reciprocating engine that employs a vacuum type carburetion system to entrain fuel. It will be appreciated that there may be a variety of engine types that utilize a gaseous blended fuel.

The various components of the fuel blending system 2 may be optimized for performance. As described elsewhere herein, a primary fuel may need to be supplemented in order to hit certain targets or predetermined thresholds. In one embodiment, the primary fuel is natural gas which is subject to pressure fluctuations and quality issues. Other fuels such as liquid propane may supplement the primary fuel, but liquid propane is more expensive than natural gas. Thus, the fuel blending system 2 logic may be as follows: use liquid propane to ensure the fuel blend is above a minimum or predetermined pressure and to ensure the fuel blend is above a minimum or predetermined quality profile (e.g., based on energy content, carbon content, etc.). After the thresholds are met, then optimized for price, which in this case means use as much natural gas as possible. It will be appreciated that there may be fuel blending systems 2 that use different fuel parameters to set different thresholds and to pursue various optimizations.

In one embodiment, the fuel blending system 2 may be combined with a Caterpillar Model G3306 Engine with vacuum carburetion. The engine would be located proximate to field gas and a liquid propane tank, which may be equipped with a vaporizer and/or heating element for the supplemental aspect of the fuel blending system 2. The propane tank may comprise a stand pipe to draw liquid from the tank for a secondary fuel train of the fuel blending system 2. During operation, if the field gas operated at 18 psi and was inconsistent or the field gas had a BTU value that was below threshold to operate the engine at full load, then a mixing point or manifold would supplement the field gas with vaporized propane. A blended sample would be collected and analyzed providing a blended BTU content with which the engine's A-Regulator and timing could be set, and later "fine-tuned" to meet emissions controls. The cost of consumption of propane would be reduced when compared to normal applications where the customer would have been forced to run solely on propane due to the inconsistent field gas pressure or quality.

Figure 2:
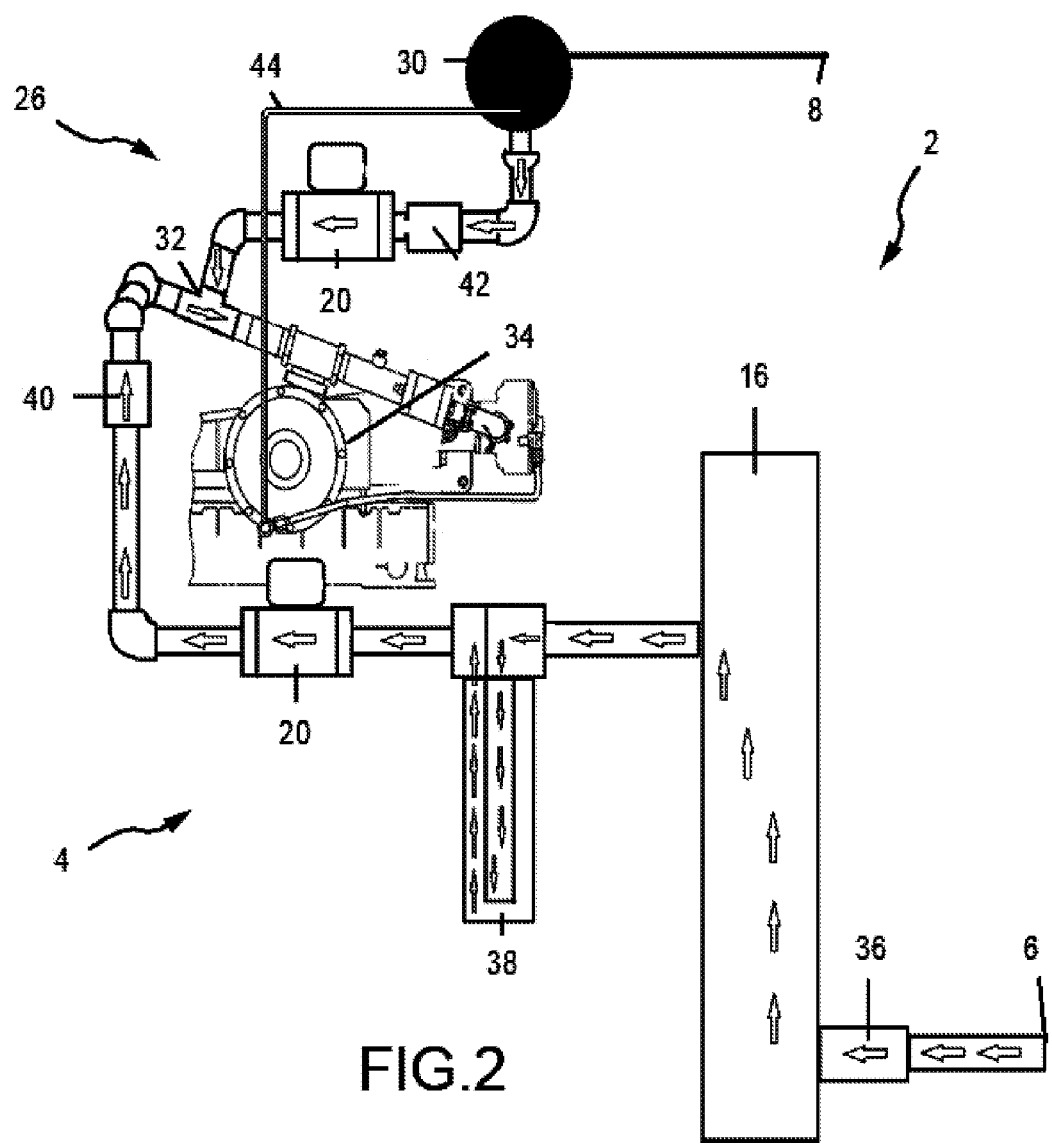
FIG. 2 is a flow diagram of another fuel blending system according to embodiments of the present invention.

Now referring to FIG. 2, another embodiment of a fuel blending system 2 is provided. A fuel tee 32 interconnects a first fuel train 4 and a second fuel train 26 to an engine 34, which may have a vacuum carburetion system to draw in fuel from the fuel tee 32 and the fuel trains 4, 26. Some engines may be naturally aspirated and thus have a substantially constant maximum intake pressure (or vacuum or draw). In other embodiments, the engine may be augmented, for example, with a turbo booster. In these embodiments, the maximum intake pressure would be the intake pressure associated with a maximum boost from the turbo booster.

The engine advantageously draws fuel from one or both fuel trains 4, 26 to optimize a parameter such as cost, BTU energy content, or any other parameter discussed elsewhere herein. The system 2 in FIG. 2 is configured to maximize consumption of a primary fuel from the first fuel train 4 to optimize for cost. However, a second fuel train 26 provides a tertiary fuel to supplement the primary fuel in the event that there is an interruption in the supply of the primary fuel. In an exemplary real world application, the primary fuel may be field gas from a produce well, and the tertiary fuel is liquid propane. As explained in further detailed below, when the pressure of the primary fuel in the first fuel train 4 is greater than the maximum pressure of the engine 34, then the engine draws only the primary fuel. When the pressure of the primary fuel drops below the maximum pressure of the engine 34, the engine 34 draws both primary fuel and tertiary fuel. Finally, when the pressure of the primary fuel drops below a predetermined value, the engine 34 draws only the tertiary fuel.

The first fuel train 4 is supplied with a primary fuel from a primary fuel input 6. In various embodiments, the primary fuel is natural gas or field gas in a gaseous state. The primary fuel passes through a first primary check valve 36 which has a cracking pressure set below the maximum pressure associated with the engine 34. The first primary check valve 36 establishes the cut off pressure that changes the fuel mixture traveling into the engine 34 from a primary fuel/tertiary fuel blend to a tertiary only fuel. In some embodiments, the cracking pressure of the first primary check valve 36 is between approximately 6 and 8 PSI, which may represent the lowest pressure of primary fuel that the engine 34 may run on or the lowest pressure that other components of the system 2 may operate effectively.

Assuming the primary fuel has a great enough pressure, the primary fuel passes through the first primary check valve 36 into a fuel reservoir 16. In some embodiments, this may be done via a 1" National Pipe Thread with the first primary check valve 36 positioned as close as possible to the fuel reservoir 16. As described above, the fuel reservoir 16 may comprise different components to help separate any residual liquid primary fuel from the gaseous primary fuel. The fuel reservoir 16 may also hold a reserve amount of the primary fuel to help with the transition between a primary fuel/ tertiary fuel mixture to a tertiary fuel into the engine 34. When the first primary check valve 36 ceases flow of the primary fuel, a reserve amount of primary fuel is needed as the tertiary fuel begins to exclusively supply the engine 34. In some embodiments the reserve amount may be approximately 1000 cubic inches. One example of a fuel reservoir 16 is a PECPFacet Model 89. Next, the primary fuel may be passed through another filter 38 to remove any particulate matter from the primary fuel.

The primary fuel is then passed through a shutoff valve 20 that may control and stop the passage of primary fuel in the event of a pressure spike, thus saving the engine 34 from any damage. Lastly, the primary fuel may pass through a second primary check valve 40 before entering the fuel tee 32. The second primary check valve 40 may be set to a relatively low cracking pressure to prevent the backflow of fuel from the fuel tee 32 back into the first fuel train 4. The cracking pressure of the second primary check valve 40 may be set between approximately 0.036 and 0.073 PSI.

The second fuel train 26 is also interconnected to the fuel tee 32, and the second fuel train 25 is supplied with a tertiary fuel from a tertiary fuel input 8. In some embodiments, the tertiary fuel may be a liquid fuel such as liquid propane. The liquid tertiary fuel may first pass into one or more vaporizers 30 to vaporize the tertiary fuel into a gaseous state. In some embodiments, the tertiary fuel is transported into two vaporizers using a ⅜" inner diameter pipe. In various embodiments, the vaporizers 30 are Impco Model E Vaporizers. The vaporizers 30 convert the liquid tertiary fuel to a gaseous tertiary fuel, and the vaporizers 30 may also regulate the pressure of the gaseous tertiary fuel as it exits the vaporizers 30. In some embodiments, the tertiary fuel pressure is regulated higher than the maximum pressure of the engine 34 so that the system 2 could run exclusively off of the tertiary fuel if needed. In some embodiments, the pressure of the tertiary fuel is regulated to approximately 0.073 PSI greater than the maximum pressure of the engine 34.

As shown in FIG. 2, an engine liquid line 44 may be used to help vaporize the tertiary fuel. Engine liquids such as radiator coolant or oil may be siphoned off from the engine 34 to help deliver heat to the liquid tertiary fuel in the vaporizer 30, which aids in the vaporization of the fuel to a gaseous state. This process also helps decrease the temperature of the engine liquid to help regulate various functions of the engine 34.

As the tertiary fuel exits the vaporizers 30, the outlet for each vaporizer 30 may be a ¾" National Pipe Thread, and the two outlets are joined together at an outlet tee. In some embodiments, the outlet tee is positioned between approximately 4 to 6" from the vaporizers 30, and in various embodiments, the outlet tee is positioned less than 14" from the vaporizers 30. The tertiary fuel passes through a tertiary check valve 42 and a shut off valve 20 before entering the fuel tee 32. The cracking pressure of the tertiary check valve 42 may be set between approximately 0.036 and 0.073 PSI. The tertiary check valve 42 may be positioned approximately equidistant between the outlet tee of the vaporizers 30 and the fuel tee 32.

The fuel tee 32 mixes the fuels from the fuel trains 4, 26, if needed, and then delivers fuel to the engine 34, wherein an engine regulator may be positioned between the engine 34 and the fuel tee 32 to tune the pressure of the fuel before entering the engine 34. In some embodiments, the fuel tee 32 is positioned less than 10" from the regulator of the engine 34.

The description of the present invention has been presented for purposes of illustration and description, but is not intended to be exhaustive or limiting of the invention to the form disclosed. Many modifications and variations will be apparent to those of ordinary skill in the art. The embodiments described and shown in the figures were chosen and described in order to best explain the principles of the invention, the practical application, and to enable those of ordinary skill in the art to understand the invention.

While various embodiments of the present invention have been described in detail, it is apparent that modifications and alterations of those embodiments will occur to those skilled in the art. Moreover, references made herein to "the present invention" or aspects thereof should be understood to mean certain embodiments of the present invention and should not necessarily be construed as limiting all embodiments to a particular description. It is to be expressly understood that such modifications and alterations are within the scope and spirit of the present invention, as set forth in the following claims.

What is claimed is:

1. A fuel blending system for an engine positioned proximate to a producing hydrocarbon wellbore, comprising:
   a fuel tee interconnected to a first fuel train and a second fuel train, said fuel tee receiving a primary fuel from said first fuel train and a tertiary fuel from said second fuel train, said fuel tee interconnected to an engine having a maximum pressure;
   the first fuel train comprising:
      a primary fuel input from the producing hydrocarbon wellbore supplying said primary fuel;
      a first primary check valve having an opening pressure that is less than said maximum pressure of said engine;
      a fuel reservoir positioned downstream from said primary check valve comprising a reservoir volume to store a predetermined volume of said primary fuel;
      a second primary check valve having an opening pressure that is less than said opening pressure of said first primary check valve;
   the second fuel train comprising:
      a tertiary fuel input supplying a liquid tertiary fuel;
      a vaporizer configured to vaporize said liquid tertiary fuel into a gaseous tertiary fuel, said vaporizer regulating a pressure of said gaseous tertiary fuel to a tertiary pressure, said tertiary pressure is greater than said maximum pressure of said engine; and
      a tertiary check valve having an opening pressure that is less than said tertiary pressure.

2. The system of claim 1, wherein the second fuel train further comprises:
   a second vaporizer configured to vaporize said liquid tertiary fuel into said gaseous tertiary fuel, said second vaporizer regulating said pressure of said gaseous tertiary fuel to said tertiary pressure, wherein an outlet tee combines outlets of the vaporizers, wherein said outlet tee is located less than approximately 6" from the outlets of the vaporizers.

3. The system of claim 2, wherein said tertiary check valve is located approximately equidistant between said outlet tee and said fuel tee.

4. The system of claim 1, wherein said opening pressure of said first primary check valve is between approximately 6 and 8 PSI.

5. The system of claim 1, wherein said opening pressure of said second primary check valve is between approximately 0.036 and 0.073 PSI, and said opening pressure of said tertiary check valve is between approximately 0.036 and 0.073 PSI.

6. The system of claim 1, wherein said tertiary pressure is approximately 0.073 PSI greater than said maximum pressure of said engine.

7. The system of claim 1, wherein said primary fuel is natural gas and said tertiary fuel is liquid propane.

8. The system of claim 1, wherein said predetermined volume of said primary fuel is approximately 1000 cubic inches.

9. The system of claim 1, wherein said fuel tee is located less than approximately 10" from a regulator of said engine.

10. A method of blending fuel for an engine, comprising:
providing a fuel tee that interconnects a first fuel train and a second fuel train to an engine having a maximum pressure;
providing, by a primary fuel input, a primary fuel for said first fuel train, said primary fuel having a pressure;
passing said primary fuel through a primary check valve having a cracking pressure that is less than said maximum pressure of said engine;
passing said primary fuel through a fuel reservoir having a reservoir volume, wherein the reservoir volume stores a reserve of said primary fuel;
providing, by a tertiary fuel input, a liquid tertiary fuel for said second fuel train;
vaporizing, by a vaporizer, said liquid tertiary fuel into a gaseous tertiary fuel, said vaporizer regulating said gaseous tertiary fuel to a tertiary pressure, said tertiary pressure is greater than said maximum pressure of said engine;
closing said primary check valve when said pressure of said primary fuel is less than said cracking pressure of said primary check valve; and
drawing said reserve of said primary fuel into said fuel tee and into said engine.

11. The method of claim 10, further comprising:
passing said primary fuel through a second primary check valve having a cracking pressure that is less than said cracking pressure of said primary check valve; and
passing said tertiary fuel through a tertiary check valve having a cracking pressure that is less than said tertiary pressure.

12. The method of claim 10, wherein said cracking pressure of said primary check valve is between approximately 6 and 8 PSI.

13. The method of claim 11, wherein said cracking pressure of said second primary check valve is between approximately 0.036 and 0.073 PSI, and said cracking pressure of said tertiary check valve is between approximately 0.036 and 0.073 PSI.

14. The method of claim 10, wherein said tertiary pressure is approximately 0.073 PSI greater than said maximum pressure of said engine.

15. The method of claim 11, wherein and said engine is positioned proximate to a producing hydrocarbon wellbore, and wherein said primary fuel is natural gas and said tertiary fuel is liquid propane.

16. The method of claim 10, wherein said reservoir volume is approximately 1000 cubic inches.

17. The method of claim 10, further comprising:
vaporizing, by a second vaporizer, said liquid tertiary fuel into said gaseous tertiary fuel, said second vaporizer regulating said gaseous tertiary fuel to said tertiary pressure, wherein an outlet tee combines outlets of the vaporizers, wherein said outlet tee is located less than approximately 6" from the outlets of the vaporizers.

18. The system of claim 17, wherein said tertiary check valve is located approximately equidistant between said outlet tee and said fuel tee.

19. The system of claim 10, wherein said fuel tee is located less than approximately 10" from a regulator of said engine.

20. A fuel blending system for an engine positioned proximate to a producing hydrocarbon wellbore, comprising:
a fuel tee interconnected to a first fuel train and a second fuel train, said fuel tee receiving a primary fuel from said first fuel train, and said fuel tee receiving a tertiary fuel from said second fuel train, said fuel tee interconnected to an engine having a maximum pressure, wherein said fuel tee is located less than approximately 10" from a regulator of said engine;
the first fuel train comprising:
a primary fuel input supplying said primary fuel;
a first primary flapper valve having a cracking pressure that is between approximately 6 and 8 PSI;
a fuel reservoir comprising a reservoir volume to store a reserve of said primary fuel, wherein said reservoir volume is approximately 1000 cubic inches;
a second primary flapper valve having a cracking pressure that is between approximately 0.036 and 0.073 PSI;
the second fuel train comprising:
a tertiary fuel input supplying a liquid tertiary fuel;
a first vaporizer configured to vaporize said liquid tertiary fuel into a gaseous tertiary fuel, said first vaporizer regulating a pressure of said gaseous tertiary fuel to a tertiary pressure, said tertiary pressure is approximately 0.073 PSI greater than said maximum pressure of said engine;
a second vaporizer configured to vaporize said liquid tertiary fuel into said gaseous tertiary fuel, said second vaporizer regulating said pressure of said gaseous tertiary fuel to said tertiary pressure, wherein an outlet tee combines outlets of the vaporizers, wherein said outlet tee is located less than approximately 6" from the outlets of the vaporizers, and
a tertiary flapper valve having a cracking pressure that is between approximately 0.036 and 0.073 PSI, wherein said tertiary flapper valve is located approximately equidistant between said outlet tee and said fuel tee.

* * * * *